NEWMAN, 2nd, WHITCOMB & COLE.
Whiffletree.
No. 115. A. I. Patented Oct. 31. 1854.
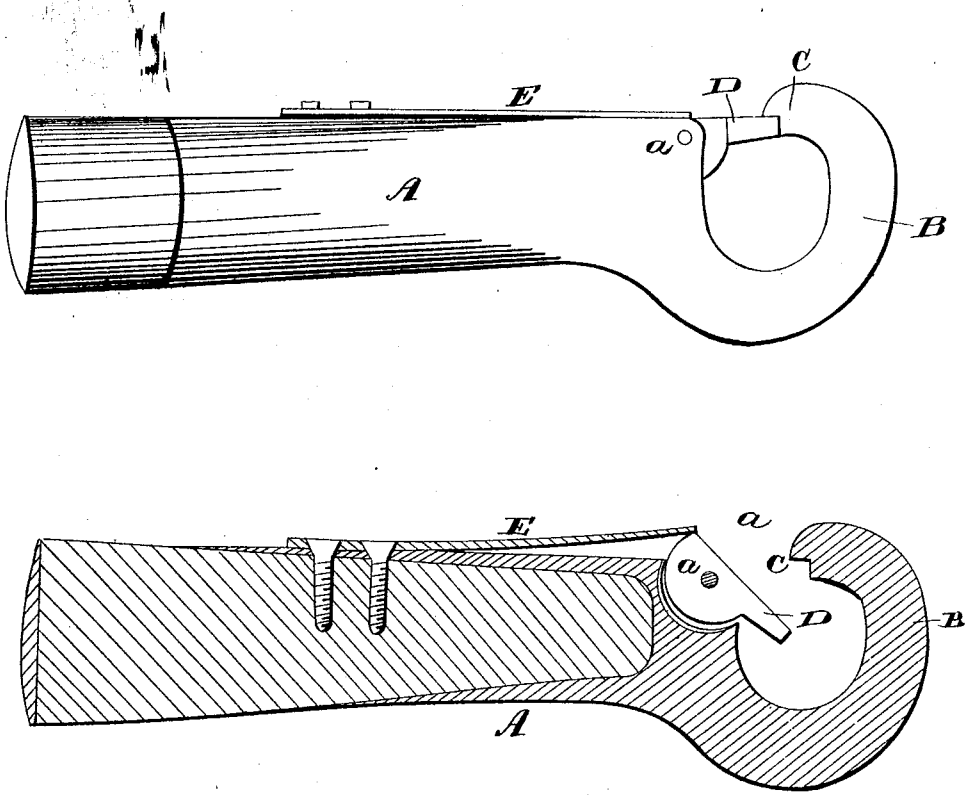
Witnesses
B. L. Norton
D. W. Norton
Inventors
M. Newman
N. C. Whitcomb
G. C. Cole
N. PETERS, PHOTO-LITHOGRAPHER, WASHINGTON, D. C.